(12) United States Patent
Hohensee et al.

(10) Patent No.: US 7,218,411 B2
(45) Date of Patent: May 15, 2007

(54) METHOD FOR NESTING FINISHING OPERATIONS IN A PRINT ENVIRONMENT

(75) Inventors: Reinhard H. Hohensee, Boulder, CO (US); David E. Stone, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 10/206,509

(22) Filed: Jul. 26, 2002

(65) Prior Publication Data

US 2004/0017582 A1    Jan. 29, 2004

(51) Int. Cl.
  *G06F 3/12*    (2006.01)
  *G06K 1/00*    (2006.01)
(52) U.S. Cl. .............. 358/1.15; 399/407; 709/203
(58) Field of Classification Search .......... 358/1.15, 358/1.9, 2.1; 709/203, 219; 399/407
See application file for complete search history.

(56) References Cited

U.S. PATENT DOCUMENTS

| | | | |
|---|---|---|---|
| 5,184,185 A | | 2/1993 | Rasmussen et al. |
| 5,461,469 A | | 10/1995 | Farrell et al. |
| 5,493,634 A | * | 2/1996 | Bonk et al. .............. 358/1.1 |
| 5,506,940 A | * | 4/1996 | Bamford et al. .......... 358/1.11 |
| 5,535,009 A | | 7/1996 | Hansen |
| 5,592,683 A | * | 1/1997 | Chen et al. ............... 710/52 |
| 5,684,934 A | * | 11/1997 | Chen et al. ............... 358/1.14 |
| 5,715,381 A | * | 2/1998 | Hamilton .................. 358/1.15 |
| 5,782,466 A | | 7/1998 | Regimbal et al. |
| 5,946,460 A | * | 8/1999 | Hohensee et al. ......... 358/1.18 |
| 6,075,617 A | | 6/2000 | Fischer et al. |
| 2002/0097407 A1 | * | 7/2002 | Ryan et al. ................ 358/1.1 |

OTHER PUBLICATIONS

Universal Printer Pre- and Post-Processing Interface, Version 1.00, Oct. 24, 2001, pp. 1, 14, and 17.*
S. D. Mastie, "Use of the transform exit sequence in printing as a framework for the solution of complex problems", IBM Journal of Research and Development, vol. 41, No. 6, 1997.*
Intelligent Printer Data Stream, Reference. Sixth Edition. IBM. Mar. 1996.*

* cited by examiner

*Primary Examiner*—Kimberly Williams
*Assistant Examiner*—Dillon Murphy
(74) *Attorney, Agent, or Firm*—Jose Gutman; Fleit, Kain, Gibbons, Gutman, Bongini & Bianco P.L.

(57) ABSTRACT

A method and system for nesting finishing operations specifies finishing operations for a printfile according to a first architecture, establishes a first communications link from a data source to a print server and carries printer control data for the finishing operations according to the first architecture, matches the printer control data with a predetermined set of rules which define an order in which the finishing operations are performed, establishes a second communications link from the print server to at least one print controller, communicates the finishing operations and the predetermined set of rules to the at least one print controller according to a second architecture, establishes a third communications link from the at least one print controller to at least one post-processing device, communicates the finishing operations to the at least one post-processing device, and performs the finishing operations according to the predetermined set of rules.

30 Claims, 5 Drawing Sheets

METHOD FOR NESTING FINISHING OPERATIONS IN A PRINT ENVIRONMENT

CROSS-REFERENCE TO RELATED APPLICATIONS

The present patent application is related to co-pending and commonly owned U.S. patent application Ser. No. 10/175,114, entitled "Bidirectional Pre- and Post- Processor Conduit Through a Bidirectional Printing Data Stream", filed on Jun. 19, 2002, the entire teachings of which being hereby incorporated by reference.

BACKGROUND OF THE INVENTION

1. Field of the Invention

The present invention relates to controlling printing equipment, and more specifically to a system and method for nesting finishing operations in a print environment.

2. Description of Related Art

High volume, high capacity printing systems have been developed that allow a variety of types of processing to be performed to the paper or other media upon which data is printed. An example of such printing system are completely automated systems that produce paper bills to be mailed to customers of utilities or other entities that mail a large number of bills. These high-speed printing systems are able to produce from several hundred to over one thousand pages per minute. These printing systems further have post-processing equipment to handle and further prepare the paper or other media that is processed by these printing systems or by successive systems (such as an off-line inserter). Examples of such post-processing equipment include machines that cut, fold, perforate, staple, edge stitch, post-print, unwind paper, insert sheets from the printer or other paper-supply sources into a stack of printer output, shrink wrap a collection of papers and stuff assembled packages of paper into envelopes for mailing. These processes are known as finishing operations.

Finishing operations are normally applied to a collection of sheets of paper, but some are applied to single sheets. Because many different post-processing devices can be attached to a printer, it is possible to apply several finishing operations to a collection of sheets and it is possible to nest collections to be finished within other collections to be finished. For example, some of the sheets of a print job might be perforated to provide for tear-off coupons and these sheets might be preceded and followed by other sheets that have no perforations; the entire print job might be corner stapled and 3-hole punched. These three finishing operations require nesting such that the corner staple operation is started first for the entire collection of sheets within the print job, nested within is a second operation (3-hole punch) that is also applied to each sheet of the print job, and finally some of the pages within the print job are perforated. When nesting finishing operations that are applied to groups of sheets, the outer operations are started first and applied last; the inner operations are started last and applied first.

Most of the current finishing solutions deal with finishing at the document level, and thereby avoid most of the issues dealing with nesting. These solutions do not involve finishing operations within a document, or among multiple documents. At a single level, e.g. the document level, the nesting of finishing operations can be managed simply by the order in which the operations are specified. To perform finishing operations outside the scope of a single level, the task typically must be done manually, consuming time and resources, and adding an opportunity to introduce human error.

Therefore a need exists to overcome the problems with the prior art as discussed above, and particularly for a method of nesting finishing operations in a print environment.

SUMMARY OF THE INVENTION

A method and system for nesting finishing operations, according to a preferred embodiment, specifies finishing operations for a printfile according to a first architecture, establishes a first communications link from a data source to a print server and carries printer control data for the finishing operations according to the first architecture, matches the printer control data with a predetermined set of rules which define an order in which the finishing operations are performed, establishes a second communications link from the print server to at least one print controller, communicates the finishing operations and the predetermined set of rules to the at least one print controller according to a second architecture, establishes a third communications link from the at least one print controller to at least one post-processing device, communicates the finishing operations to the at least one post-processing device, and performs the finishing operations according to the predetermined set of rules.

In the exemplary embodiment, the first architecture is Mixed Object Document Content Architecture (MO:DCA) and the second architecture is Intelligent Printer Data Stream (IPDS). The communications link from the at least one print controller to the at least one post-processing device may be a Universal Pre- and Post-Processing Interface bus.

Other features and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

The AFP (Advanced Function Presentation) Architecture has defined rules and structures that allow nesting of finishing operations to be specified and processed in a consistent, predictable manner. These rules and structures are defined at the application (Mixed Object Document Content Architecture (MO:DCA) data stream) level and at the printer (Intelligent Printer Data Stream (IPDS) data stream) level so that the nesting expected by the end-user is the same as the nesting that is applied by the print/post-processing system.

Figure 1:
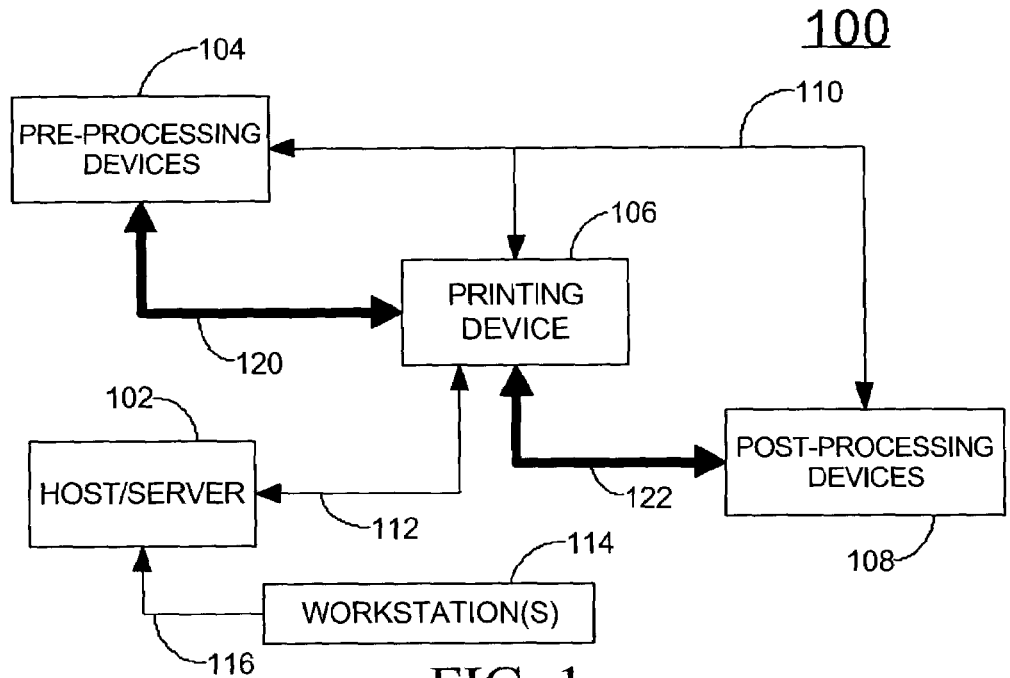
FIG. 1 is a schematic diagram of a printing equipment communications architecture in accordance with an exemplary embodiment of the present invention.

A printing equipment configuration 100 of an exemplary embodiment of the present invention is illustrated in FIG. 1. The printing equipment configuration 100 of the exemplary embodiment has a host/server 102 that generates data files that define documents to print. The exemplary embodiment includes one or more workstations 114 that are used by graphic designers or users with other skills to define part or all of the document to print. Other embodiments utilize other processing architectures to allow the definition of the documents and packages to print. The printing equipment configuration 100 also includes high speed, high volume printers that handle and produce several hundred to over one thousand pages per minute. This printing equipment configuration 100 has a printing device 106 that performs the primary printing task of placing the specified image on a sheet of paper. The printing device 106 of the exemplary embodiment receives data defining the documents to print from the host/server 102. The data generated by the workstation 114 and received by the host/server 102 of the exemplary embodiment conforms to the MO:DCA (Mixed Object Document Content Architecture) architecture. The data generated by the host/server 102 and received by the printing device 106 of the exemplary embodiment conforms to the IPDS architecture. The IPDS architecture is defined in the Intelligent Printer Data Stream Reference, IBM Publication #S544-3417-05, Sixth Edition dated March 1996. The MO:DCA architecture is defined in the Mixed Object Document content Architecture Reference, IBM Publication #SC31-6802-05, Sixth Edition, Dated April 2001. The entire contents and teachings of the Intelligent Printer Data Stream Reference and the Mixed Object Document Architecture Reference are hereby incorporated herein by reference.

The printing device 106 (which might contain more than one marking engine) processes paper that is transferred between the printing device 106 and pre-processing devices 104 as well as post-processing devices 108. Paper is transferred into and out of the printing device 106 via the pre-processing device paper path 120 and the post-processing device paper path 122. Embodiments of the present invention are able to operate with one or more pre-processing device within the pre-processing devices 104 and/or one or more post-processing device as part of the post-processing devices 108.

The pre-processing devices 104 and the post-processing devices 108 of the exemplary embodiment accept commands that conform to a protocol that is part of the Universal Printer Pre- and Post- Processing Interface (UP$^3$I). The UP$^3$I is defined in the UP$^3$I$^{tm}$ Specification, produced by the UP$^3$I Core Group, the entire contents and teachings of which is hereby incorporated herein by reference. The printing device 106, pre-processing devices 104 and post-processing devices 108 of the exemplary embodiment of the present invention are electrically connected via a Universal Printer Pre- and Post- Processing Interface (UP$^3$I) bus 110. The UP$^3$I bus 110 of the exemplary embodiment includes an electrical interface that conforms to the IEEE 1394 standard defined by the Institute of Electrical and Electronics Engineers (IEEE) of Piscataway, N.J. The UP$^3$I bus 110 of the exemplary embodiment conveys commands for pre-processing and post-processing operations that are to be performed by the pre-processing devices 104 and the post-processing devices 108, respectively. The commands communicated via the UP$^3$I bus 110 conform to the UP$^3$I protocol.

A print file containing documents in MO:DCA format, also called Advanced Function Presentation (AFP) format, is generated on workstation 114 and sent to host/server 102 via a network connection 116 for printing. The print request is accompanied by a job ticket, such as a MO:DCA Form Definition, that specifies finishing operations to be performed on the print file. In the exemplary embodiment, the finishing operations are specified in a Form Definition using UP$^3$I commands and parameters. The host/server 102 of the exemplary embodiment accepts the print file and job ticket, and derives a composite data stream that consists of an IPDS data stream and an encapsulated UP$^3$I data stream that contains the printing finishing commands for the print file.

The printing device 106 of the exemplary embodiment contains an internal printer controller that receives and processes commands sent by the host/server 102. The internal printer controller of the exemplary embodiment accepts data and commands from the host/server 102 via the IPDS connection 112 and then controls the print engine within the printing device 106 so as to generate the required printed output. The internal controller of the exemplary embodiment further receives the pre-processing and post-processing commands, which are referred to collectively as finishing commands, that are transmitted by the host/server 102 and transmits the associated UP$^3$I commands over the UP$^3$I bus 110 to the pre-processing devices 104 and/or post-processing devices 108. The internal controller of the printing device 106 further monitors the UP$^3$I bus 110 for status information that is generated by devices on the UP$^3$I bus 110, including the pre-processing devices 104 and post-processing devices 108. The status information transmitted by the pre-processing devices 104 and/or the post-processing devices 108 conforms to the UP$^3$I protocol. Upon receipt of status information over the UP$^3$I bus 110, the internal controller of the printing device 106 of the exemplary embodiment generates a corresponding IPDS acknowledgment for transmission over the IPDS bus 112 to the host/server 102. The status information can contain operational characteristics and capabilities as well as error information.

The structures used in the MO:DCA Form Definition to carry finishing commands and parameters conform to the MO:DCA architecture, while the actual finishing commands and parameters conform to the UP$^3$I$^{tm}$ Specification. This allows continued use of software that generates and processes MO:DCA constructs.

The commands issued by the host/server 102 in the exemplary embodiment conform to the IPDS architecture. This allows continued use of software and processing procedures that produce IPDS commands. The IPDS protocol used by the host/server 102 of the exemplary embodiment has been modified to include new IPDS commands that allow communication of UP$^3$I pre-processing and post-processing commands in order to control or monitor the pre-processing devices 104 and/or the post-processing devices 108. The exemplary embodiments of the present invention advantageously allow existing protocols to be generated by the workstation 114 and the host/server 102 although pre-processing devices 104 and post-processing devices 108 require a different protocol. The exemplary embodiments also allow the sharing of device-capabilities description, error recovery, and page tracking information between the UP$^3$I portion of the system and the AFP/IPDS portion of the system. The printing device 106 of the exemplary embodiment interprets these pre-processing and post-processing commands and performs communications via the UP$^3$I bus 110 that corresponds to pre-processing and post-processing commands that are contained within received IPDS commands.

Alternative embodiments of the present invention utilize pre-processing devices 104 and post-processing devices 108 that do not directly accept UP$^3$I commands. These pre- and post- processing devices are either physically incorporated within the same unit as the printing device 106, or they are connected to the printing device 106 via a non-UP$^3$I interface. The internal printer controller in these embodiments processes the UP$^3$I data that is communicated via the IPDS bus 112 and communicates the correct commands to these other pre- and post-processing devices. It is within the spirit and scope of this invention to support a variety of interconnections between the printing device 106 and the pre-processing devices 104 and post processing devices 108. Embodiments of the present invention further use other protocols, aside from the IPDS and UP$^3$I protocols, to control all or some of the pre-processing devices 104, post processing devices 108 and the printing device 106.

Figure 2:
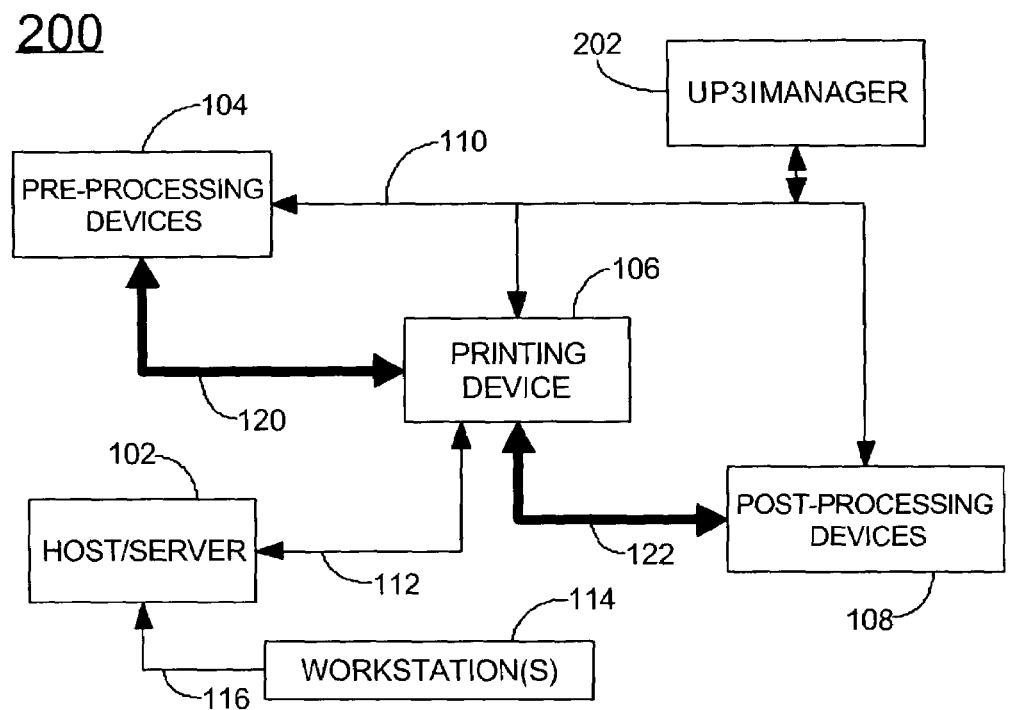
FIG. 2 is a schematic diagram of an alternative printing equipment communications architecture in accordance with a preferred embodiment of the present invention.

An exemplary expanded printing equipment configuration 200 is illustrated in FIG. 2. This expanded printing equipment configuration 200 includes the same components of the previous exemplary printing equipment configuration 100 with the addition of a UP$^3$I manager 202. The UP$^3$I manager 202 is connected to the UP$^3$I bus 110 to monitor data transmitted by those devices onto the UP$^3$I bus 110. This allows direct monitoring of the UP$^3$I data generated by the devices.

Figure 3:
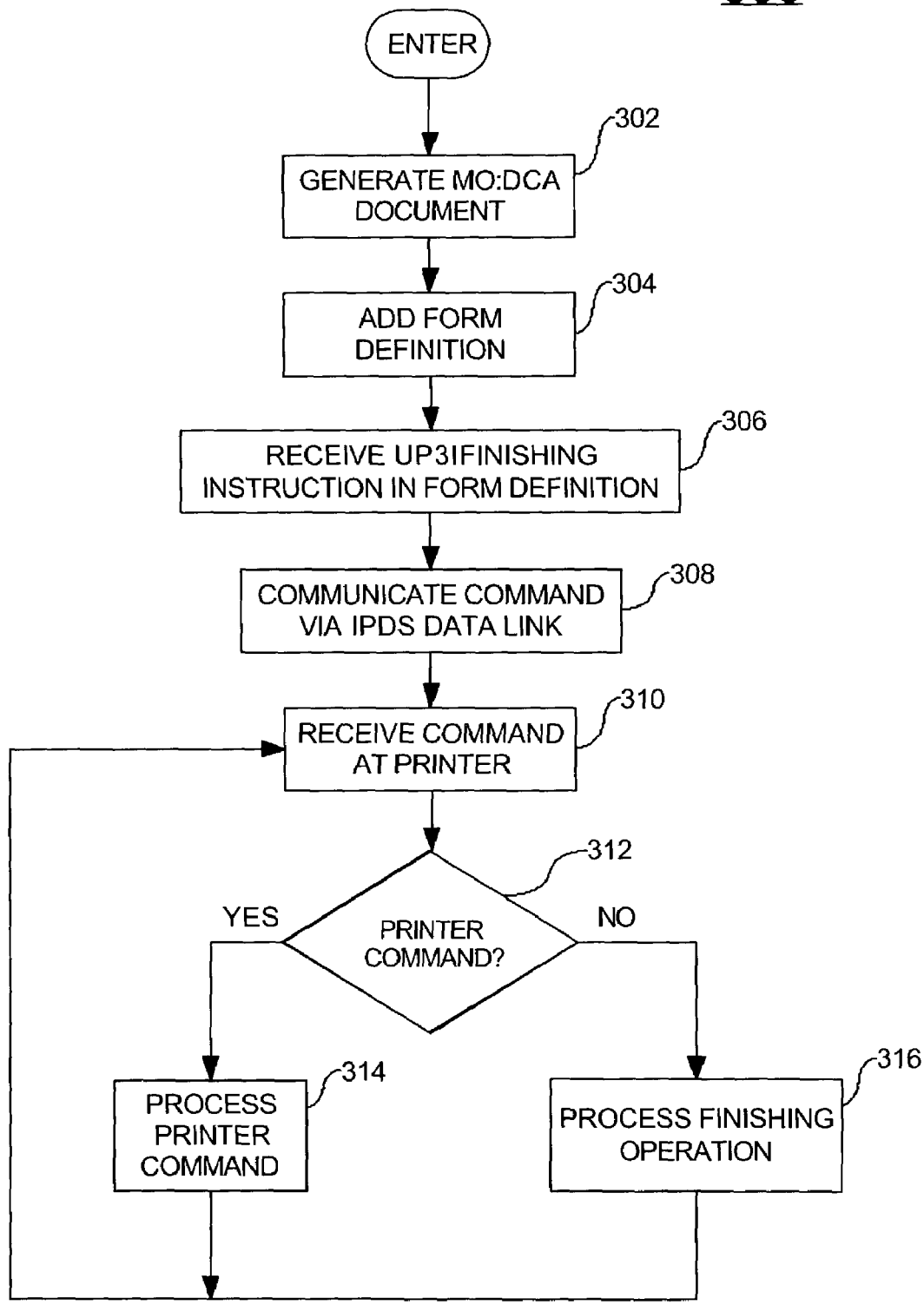
FIG. 3 is a process flow diagram for communicating finishing operation commands in accordance with an exemplary embodiment of the present invention.

An exemplary command communications processing flow 300 is illustrated in FIG. 3. The processing begins, at step 302, where a user generates a MO:DCA document for a specified printfile (data source). A Form Definition Creation tool (not shown) adds a Form Definition, at step 304, that specifies UP$^3$I finishing operations for the print file. The host/server receives a print file along with its MO:DCA document and matches it with a Form Definition at step 306. The order of performance of the finishing operations is determined by a set of rules within the form definition. The processing continues, at step 308, by communicating a command via the IPDS data link from the host/server 102 to the printing device 106. A print controller, which may be located within the printing device 106 of the exemplary embodiment, receives the command at step 310. The print controller within the printing device 106 examines the received command and determines, at step 312, whether the received command is a printer command or a finishing operation (post-processor) command. If the command is a printer command, the command is processed, at step 314. An example of a printer command is a command that places text data on a page. If the command is not a printer command, the processor within the printing device 106 of the exemplary embodiment generates the associated UP$^3$I command and transmits that command, at step 316. In the normal course of printer operations or in response to specific IPDS commands, UP$^3$I commands might also be generated by printing device 106. It should be noted that post-processing devices 108 may be located, as shown in FIGS. 1 and 2, on a UP$^3$I bus, or alternatively, directly connected to the printing device 106, or even within the printing device 106.

Finishing Operation Nesting Rules at the Page Description Language (MO:DCA Data Stream) Level When more than one finishing operation that involves a collection of media is specified for some portion of the print file, a nesting of the operations is defined first by the scope of the operation (print file, document, medium-map) and second by the order of the operation in the data stream. Finishing operations with an inherently broader scope, e.g. operations at the print file level, are nested outside of finishing operations with on inherently narrower scope, e.g. operations at the medium-map (sheet-group) level.

The finishing operations are specified with Finishing Operation triplets on the Medium Finishing Control (MFC) structured field, which is specified in the Document Environment Group (DEG) and the medium maps of a Form Definition which is associated with a print file. Note that a Form Definition is specified at print submission time and contains a single DEG and multiple medium maps. When the MFC is specified in the DEG, it controls print-file-level and document-level finishing. Medium maps can be invoked on any page boundary in the document using Invoke Medium Map (IMM) structured fields; therefore an MFC that is specified in a medium map controls page-group or sheet-group level finishing. The MFCScpe parameter in the MFC structured field specifies the scope of the operation, as follows:

MFCScpe X'01': Print-file level MFC
MFCScpe X'02': Document-level MFC, all documents
MFCScpe X'03': Document-level MFC, single document
MFCScpe X'04': Medium-map (sheet-group) level MFC, each medium or sheet
MFCScpe X'05': Medium-map (sheet-group) level MFC, collection of media or sheets If more than one operation is specified with the same scope, e.g. if two operations are specified at the medium-map level, the order of the Finishing Operation triplets—whether specified on the same Medium Finishing Control (MFC) structured field or on different MFCs—defines the order of the nesting. In that case, the first finishing operation specified defines the outermost nesting, and the last finishing operation specified defines the innermost nesting.

The following defines how finishing operations are nested starting with the outermost nesting and ending with the innermost nesting.
Print-file level finishing operations (outermost level), MFCScpe=X'01'
Document-level finishing operation—each document in the print file, MFCScpe=X'02'
Document-level finishing operation—a selected document in the print file, MFCScpe X'03'
Medium-map-level finishing—collection of media, (innermost level) MFCScpe=X'05'.

Nesting may in turn affect the scope of a finishing operation. When a finishing operation is applied, all finishing operations nested inside this operation are also applied. Finishing operations that are nested outside this operation are not affected. Note that nesting does not apply to medium-map-level sheet finishing (MFCScpe=X'04'). Such finishing is applied to individual sheets and does not involve starting, continuing, and ending a collection of sheets. Each Medium Map that is to generate such finishing must specify the operation explicitly.

The MedColl parameter in the MFC structured field specifies the boundary conditions for medium-map (sheet-group) level finishing. This field is required if MFCScpe=X'05'. This field is ignored unless MFCScpe=X'05'. MedColl can have two values:

X'01' Begin finishing collection
X'02' Continue finishing collection

In the case where MFCScpe does not equal X'05', a "null value", X'00' is used as a placeholder.

An MFC structured field with MFCScpe=X'05' and MedColl X'01' (Begin Finishing Collection) values causes the sheets controlled by this medium map to be collected for the operation(s) specified in the Finishing Operation triplet(s) of the MFC. If a collection for this same operation is already in progress from a previous medium map, then the invocation of this medium map (using an Invoke Medium Map structured field) ends that collection and performs the operation (such as stapling). The collection operation begins anew with sheets following the invocation of this medium map. Hence, the invocation of the "Begin Finishing Collection" command will force a sheet eject. All sheets controlled by a medium map with MFCScpe=X'05' and MedColl=X'01' will be part of a collection of sheets on which the operations specified in this MFC will be performed. In addition, any operations specified by document or printfile level MFCs will also be applied to these sheets.

An MFC structured field with MFCScpe=X'05' and MedColl X'02' (Continue Finishing Collection) values continues an operation previously started by an MFCScpe=X'05'. If a collection for an operation specified in a Finishing Operation triplet for this structured field is already in progress from a previous medium map with MFCScpe=X'05', then this medium map has no affect on that operation. The collection for that operation continues as if no medium map has been invoked. All sheets controlled by this medium map will be collected for the finishing collection operation(s) specified in this medium map. In addition, any operations specified by document or printfile level MFCs will also be applied to these sheets. The invocation of this medium map will cause a sheet eject if and only if one or more of the operations specified in the Finishing Operation triplet(s) are not already in progress when this medium map is invoked.

A finishing collection started by invocation of a medium map with MFCScpe=X'05' will be ended at document end, and will be ended when a medium map with MFCScpe that is nested outside this operation ends, and also will be ended by invocation of any medium map that does not contain a MFCScpe=X'05' with MedColl='X'02' for that specific finishing operation. Examples of medium maps that will end the collection include:

A medium map with no MFC Structured Field
A medium map that has MFC Structured Fields with MFCScpe X'04', but none with MFCScpe X'05'
A medium map with an MFC specifying MFCScpe X'05' and MedColl X'01'
A medium map that contains an MFC specifying MFCScpe X'05' and MedColl X'02', but does not contain an Finishing operation triplet for the finishing collection operation in progress.
A medium map that ends a finishing operation, which is nested outside this finishing operation.

Figure 4:
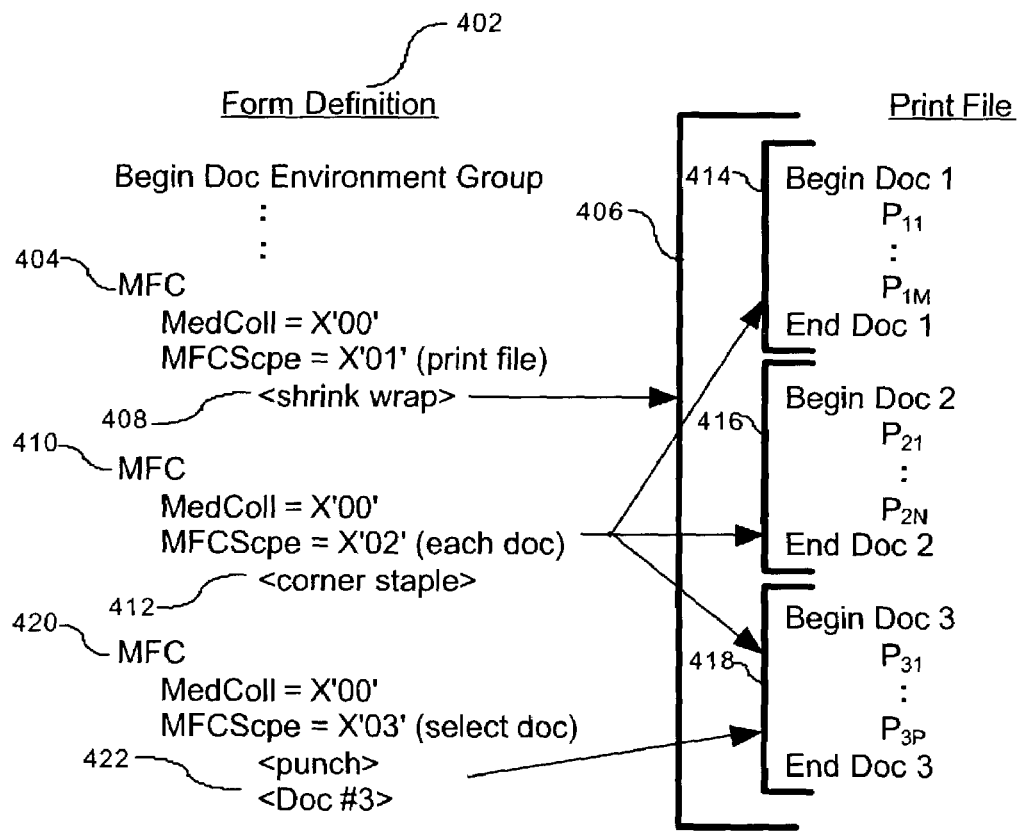
FIG. 4 is an example showing nesting finishing operations at the "print file" level, the "all document" level, and the "single document" level, in accordance with an exemplary embodiment of the present invention.

FIG. 4 illustrates an exemplary Document Environment Group portion of a Form Definition showing nesting finishing operations at the "print file" level, the "all document" level, and the "single document" level, in accordance with an exemplary embodiment of the present invention. The exemplary Form Definition command flow 400 describes a complete print package that has three nesting levels or subportions defined by MFC structured fields. In the exemplary embodiment, each time a new nesting level is defined, an MFC structured field is specified.

The first package sub-portion is initiated by the first MFC command 404 that defines the MFCScpe as X'01', and consequentially, uses the null value X'00' for the MedColl parameter. The first package sub-portion includes the entire print package 406. The first MFC command 404 includes a first finishing operation command 408 that specifies the finishing operation "shrink wrap". This finishing operation will shrink wrap the entire collection of all of the pages within the printfile 406. This is the outermost nesting level and its finishing operation is performed last.

The second package sub-portion is initiated by the second MFC command 410 that defines the MFCScpe as X'02', and again, uses the null value X'00' for the MedColl parameter. Corner staple, the finishing operation 412 of this MFC field, is applied to each document 414, 416, 418 within the printfile 406. In other words, each of the three documents 414, 416, 418 contained within the printfile 406, are individually corner-stapled. This is the next level of nesting and its finishing operation is performed next-to-last.

The third package sub-portion is initiated by the third MFC command 420 that defines the MFCScpe as X'03', and once again, uses the null value X'00' for the MedColl parameter. The finishing operation of this MFC field, "punch" 422, is applied only to the one document specified, Doc #3. So, this MFC field causes Document #3 to be three-hole punched. This is the innermost nesting level for Document #3 and its finishing operation is performed first.

Figure 5:
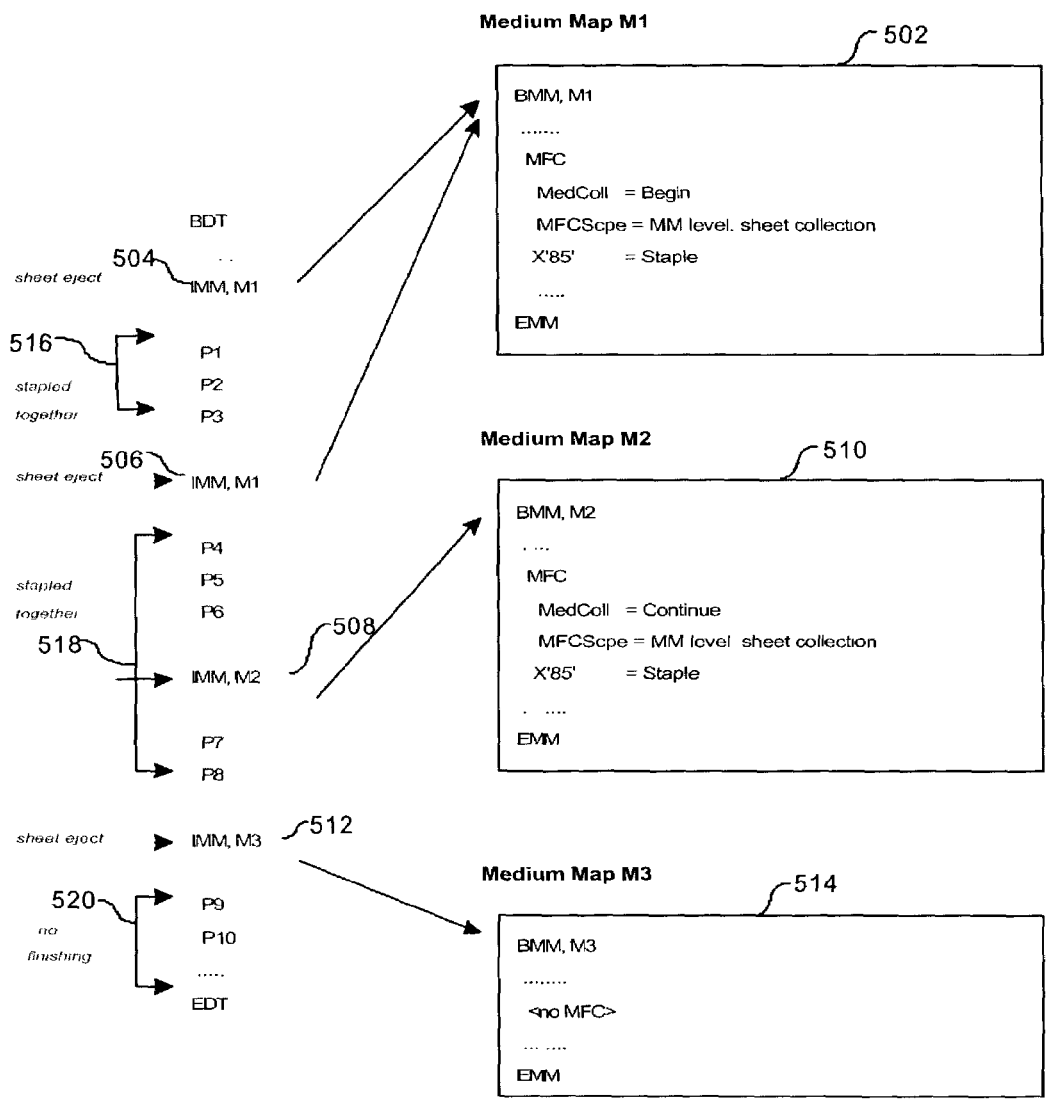
FIG. 5 is an example showing nesting finishing operations at the medium-map (sheet-group) level in accordance with an exemplary embodiment of the present invention.

FIG. 5 illustrates an example of nesting finishing operations at the sheet-group or page-group level. Here groups of pages within a document are selected for finishing. This finishing can be nested within single-document finishing, which in turn can be nested within finishing applied to all documents individually, which in turn can be nested within finishing applied to the complete print file. This finishing is specified in an MFC structured field in a medium map in the Form Definition. Note that a Form Definition can contain multiple medium maps. Medium maps are invoked with Invoke Medium Map (IMM) structures that can be specified between the pages in a MO:DCA document.

In the example of FIG. 5, M1, the first medium map 502, is invoked by the first IMM command 504. M1 502 specifies an MFC having an MFCScpe=X'05' (sheets within a document), a MedColl=X'01' (Begin Finishing Collection), and a finishing operation of "staple". When the first medium map 502 is invoked, the finishing equipment begins collecting pages—which are printed on sheets—according to the next page listed, P1. When the second IMM command 506 is received, it too has a MedColl=X'01', thereby causing a sheet eject and the finishing operation of the first IMM command 504, staple, to be performed on the collection of pages 516 started with the first IMM command 504. In this case, pages 1–3 are stapled together. The second IMM command 506, triggers the finishing equipment to begin collecting pages again. Pages are collected until the third IMM command 508 is received. In this case, the medium map 510 called by the third IMM command 508 contains a MedColl value of X'02', or Continue Finishing Collection, and the finishing operation is the same as in the previous IMM command, "staple". So, the collection 518 is continued until a fourth IMM command 512 is received. At this point, the fourth IMM command 512 invokes medium map M3 514, which contains no MFC triplet and thereby causes a sheet eject and the sheets 518 collected since the last Begin Finishing Collection command was issued, to be stapled. In this case, the sheets containing pages 4–8 are stapled. Finally, the remaining sheets 520 in the document, containing pages 9–10, have no finishing operation performed.

Finishing Operation Nesting Rules of the Printer Data Stream (IPDS Data Stream) Level Finishing operations and nesting rules at the application data stream (MO:DCA) level are transformed into finishing operations and nesting rules at the printer data stream (IPDS) level by the host/server 102.

The IPDS Architecture provides two commands that are used to specified desired finishing operations: the Apply Finishing Operations (AFO) command is used for operations that apply to a single sheet, and the XOH Define Group Boundary (DGB) command is used to identify and finish a group of sheets.

To finish a group of sheets, the XOH Specify Group Operation (SGO) command must first be issued to identify a group level to which the "finish" operation is applied. XOH Define Group Boundary commands must then be issued both before the first page of the group and after the last page of the group. The first XOH Define Group Boundary command of a group contains a Finishing Operation triplet to specify the parameters needed for the particular finishing operation; it is also possible to apply multiple operations to the group by including multiple Finishing Operation triplets on this command. A second method of applying multiple operations is to nest pairs of XOH Define Group Boundary commands.

Nesting of finishing operations is controlled by group levels. A precise hierarchical order defines the group levels such that a group can contain groups of lesser group levels but cannot contain groups of equal or greater group levels. For example, a group of level 80 can contain a group (or groups) of level 60, but cannot contain groups of level 80 or 90. In addition, the XOH DGB command that terminates a group level is optional, and if a XOH DGB command is received that attempts either to initiate or terminate a group, all initiated but not yet terminated groups of lesser or equal group levels are automatically terminated.

In most cases, group operations apply to all of the pages of a group including those pages within nested groups; however some group operations are incompatible with each other. In this case, the operation on the inner group is ignored.

In addition to finishing, the IPDS Architecture defines other group operations such as "save pages", "keep group together as a print unit", and "identify named group". Multiple operations can also be applied to a single group level by specifying multiple XOH SGO commands. In addition, some operations (such as finishing) can be applied to a group multiple times by specifying multiple group-operation triplets on the XOH DGB command. For the purpose of determining how these group operations interact, the group is considered to be nested within itself and the order of the XOH SGO commands and group-operation triplets determines the nesting.

Each XOH SGO command is saved by the printer for use with subsequent groups. It is valid to specify multiple XOH SGO commands that use the same group level, but specify different group operations; in this case multiple operations are applied to any subsequent group with that group level. It is also valid to specify multiple XOH SGO commands that use the same operation, but specify different group levels; in this case the operation is applied to each group that contains one of the specified group levels. XOH SGO commands that duplicate a previously received XOH SGO command are ignored.

Figure 6:
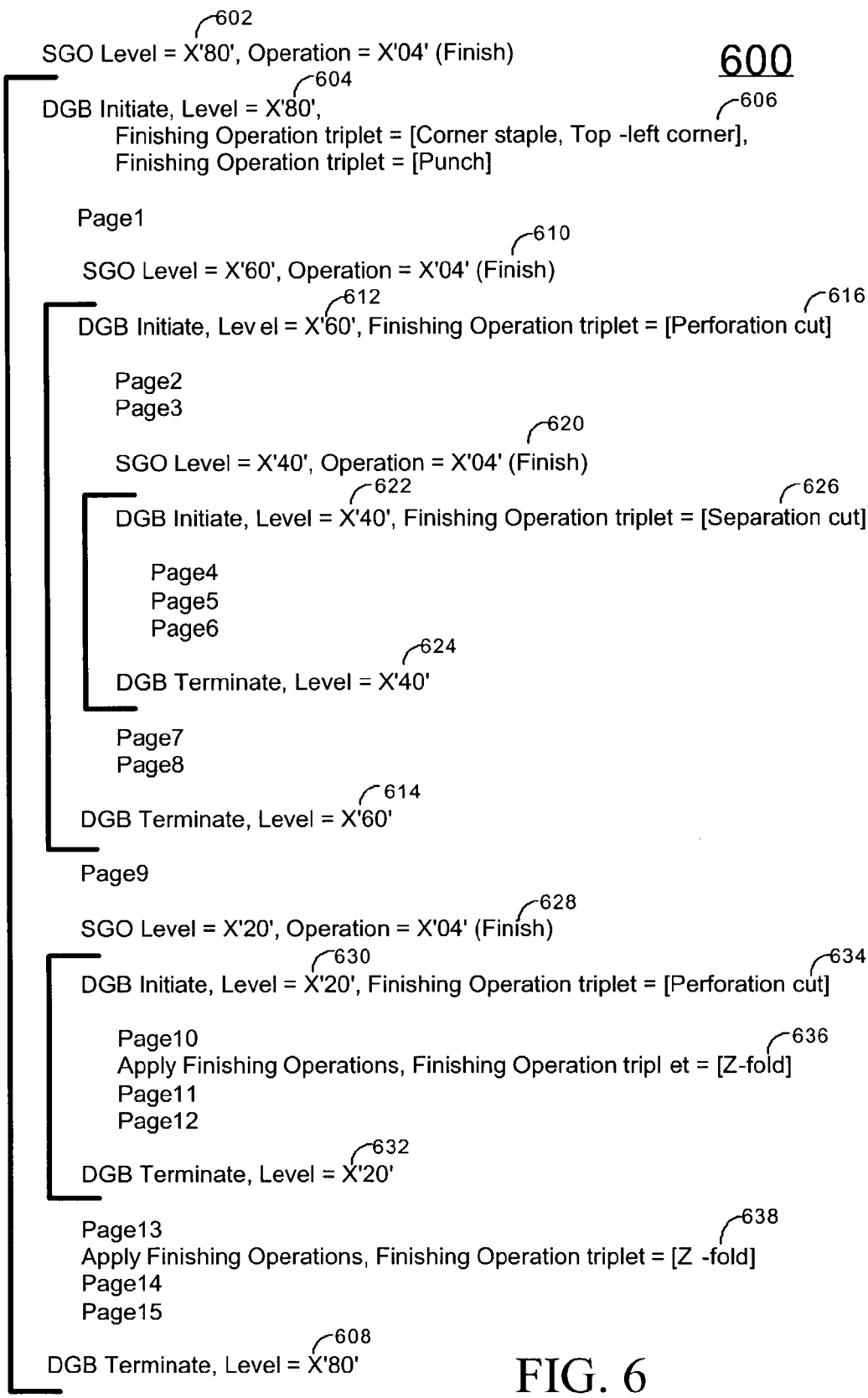
FIG. 6 is an example showing several finishing operations in the context of an IPDS data stream, in accordance with an exemplary embodiment of the present invention.

An exemplary IPDS data stream that includes UP$^3$I Triplets is illustrated in FIG. 6. Finishing Operation triplets are initially specified on the Medium Finishing Control (MFC) structured field in the MO:DCA Form Definition at print-job submission. The exemplary IPDS command flow 600 describes a complete print package which has four nesting levels or sub-portions defined by the IPDS commands XOH DGB (Define Group Boundary) and XOH SGO (Specify Group Operation), which are shown as "DGB" and "SGO" commands in the exemplary IPDS command flow 600. In the exemplary embodiment, each time a new nesting level is defined, an XOH SGO command is specified.

The first package sub-portion is initiated by the first XOH SGO command 602 that defines the level as X'80' and the operation to be X'04', "finishing operations." The first package sub-portion is defined by a first DGB command 604 and is terminated by a first DGB Terminate command 608, both for level X'80' as defined by the first SGO command 602. The first package sub-portion includes the entire print package, which are pages one through fifteen, in this example. The first DGB command 604 includes a first finishing operation command 606 that specifies two finishing operation triplets—a first specifying "Corner staple, Top-left corner" and another specifying "Punch." These finishing operations will be applied to all of the pages within the first package sub-portion. The finishing operation triplets used in the first DGB command 604 causes the first package sub-portion, which is the entire document in this example, to be punched and stapled at the top left corner.

The second package sub-portion is initiated by the second SGO command 610 that defines the level as X'60' and the operation to be X'04', "finishing operations." The second package sub-portion is defined by the second DGB command 612 and is terminated by the second DGB terminate command 614, both for level X'60' as defined by the second SGO command 610. The second package sub-portion in this example includes only part of the print package, i.e., page 2 through page 8. The second DGB command 612 includes a second finishing operation command 616 that contains one finishing operation triplet specifying "Perforation cut." The finishing operation triplet within the second finishing operation command 616 of this example causes the pages within the second package sub-portion to be cut using a perforation cut.

The third package sub-portion is initiated by a third SGO command 620 that defines the level as X'40' and the operation to be X'04', "finishing operations." The third package sub-portion is defined by a third DGB command 622 and is terminated by a third DGB terminate command 624, both for level X'40' as defined by the third SGO command 620. The third package sub-portion in this example includes only part of the print package, i.e., page 4 through page 6. The third DGB command 622 includes a third finishing operation command 626 that contains one finishing operation triplet specifying "Separation cut." The finishing operation triplet within the third finishing operation command 626 of this example causes the pages within the third package sub-portion to be cut with a separation cut.

The fourth package sub-portion is initiated by a fourth SGO command 628 that defines the level as X'20' and the operation to be X'04', "finishing operations." The fourth package sub-portion is defined by a fourth DGB command 630 and is terminated by a third DGB terminate command 632, both for level X'20' as defined by the third SGO command 628. The fourth package sub-portion in this example includes only part of the print package, i.e., page 10 through page 12. The fourth DGB command 630 includes a fourth finishing operation command 634 that contains one finishing operation triplet specifying "Perforation cut." The finishing operation triplet within the fourth finishing operation command 634 of this example causes the pages within the fourth package sub-portion to be cut with a perforation cut. Additionally, an Apply Finishing Operation command 636 contains one finishing operation triplet specifying "Z-fold". This finishing operation triplet causes the next page, in this example page 11, to be folded using a z-fold. A second Apply Finishing Operation command 638 contains one finishing operation triplet, also specifying "Z-fold". This finishing operation triplet causes page 14 to be folded using a z-fold.

The results of the example of FIG. 6 are:

All 15 pages are corner stapled and 3-hole punched

A perforation has been cut in all of the pages of two groups:
1) Page 2 through Page 8
2) Page 10 through Page 12

A separation cut has been made to the pages of one group (perhaps the bottom 1" has been cut off):
Page 4 through Page 6

Two pages have been Z-folded:
Page 11 and Page 14

ALTERNATIVE EMBODIMENTS

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when loaded and executed, controls the computer system such that it carries out the methods described herein.

The present invention can also be embedded in a computer program product, which comprises all the features enabling the implementation of the methods described herein, and which—when loaded in a computer system—is able to carry out these methods. In the present context, a "computer program" includes any expression, in any language, code or notation, of a set of instructions intended to cause a system having an information processing capability to perform a particular function either directly or after either or both of the following: a) conversion to another language, code, or notation; and b) reproduction in a different material form.

Each computer system may include one or more computers and a computer readable medium that allows the computer to read data, instructions, messages, or message packets, and other computer readable information from the computer readable medium. The computer readable medium may include non-volatile memory such as ROM, Flash memory, a hard or floppy disk, a CD-ROM, or other permanent storage. Additionally, a computer readable medium may include volatile storage such as RAM, buffers, cache memory, and network circuits. Furthermore, the computer readable medium may include computer readable information in a transitory state medium such as a network link and/or a network interface (including a wired network or a wireless network) that allow a computer to read such computer readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method of nesting finishing operations comprising:
receiving printer control data for controlling printing and finishing operations according to the printing and finishing architecture;
matching the printer control data with a predetermined set of rules that define an order in which the printing and finishing operations are performed, wherein the predetermined set of rules specifies performing the finishing operations according to a structured hierarchy determined by a scope of the finishing operations, and wherein the structured hierarchy comprises:
an innermost level comprising medium-map-level finishing on a collection of media,
a second level comprising document-level finishing on a selected document in the print file,
a third level comprising document-level finishing on each document in the print file; and
an outermost level comprising print-file level finishing operations;
nesting commands, that correspond to the printing and finishing operations, according to the defined order in which the printing and finishing operations are performed, wherein the nesting of at least the commands corresponding to the finishing operations is performed at least at a page description language level; and
providing control signals for controlling printing and finishing equipment according to the ordered commands.

2. A method of nesting finishing operations comprising:
specifying finishing operations for a printfile according to a first architecture, wherein the first architecture is a page description language architecture;
establishing a first communications link from a data source to a print server, wherein the first communications link carries printer control data for the finishing operations according to the first architecture;
matching the printer control data with a predetermined set of rules which define an order in which the finishing operations are performed, wherein the predetermined set of rules specifies performing the finishing operations according to a structured hierarchy determined by a scope of the finishing operations, and wherein the structured hierarchy comprises:
an innermost level comprising medium-map-level finishing on a collection of media,
a second level comprising document-level finishing on a selected document in the print file,
a third level comprising document-level finishing on each document in the print file; and
an outermost level comprising print-file level finishing operations;

nesting commands that correspond to the finishing operations, wherein each command is nested according to a scope of the corresponding finishing operation and the defined order in which the finishing operation is performed;
establishing a second communications link from the print server to at least one print controller;
communicating the finishing operations and the predetermined set of rules to the at least one print controller according to a second architecture;
establishing a third communications link from the at least one print controller to at least one post-processing device;
communicating the finishing operations to the at least one post-processing device; and
performing the finishing operations according to the predetermined set of rules.

3. The method of claim 2, wherein the first architecture is Mixed Object Document Content Architecture.

4. The method of claim 2, wherein the first architecture comprises a data structure comprising:
a first parameter specifying a scope of a finishing operation;
a second parameter specifying boundary conditions for medium-map level finishing; and
a third parameter specifying the finishing operation.

5. The method of claim 2, wherein the second architecture is Intelligent Printer Data Stream.

6. The method of claim 2, wherein the second architecture comprises a data structure comprising:
a first parameter specifying a scope of a finishing operation;
a second parameter specifying boundary conditions for medium-map level finishing; and
a third parameter specifying the finishing operation.

7. The method according to claim 2, wherein the second communications link is a bi-directional, point-to-point link between the printer server and a printer.

8. The method according to claim 2, wherein the third communications link comprises a Universal Printer Pre- and Post- Processing Interface data link that connects the at least one print controller to the at least one post-processing device.

9. The method according to claim 2, wherein the predetermined set of rules is a Form Definition.

10. The method according to claim 9, wherein the Form Definition comprises at least one medium map.

11. A system comprising:
a memory comprising a predetermined set of rules that define an order in which printing and finishing operations are performed in a printing and finishing architecture; and
at least one controller, communicatively coupled to the memory, for:
receiving printer control data for controlling printing and finishing operations according to the printing and finishing architecture;
matching the printer control data with the predetermined set of rules that define an order in which the printing and finishing operations are performed, wherein the predetermined set of rules specifies performing the finishing operations according to a structured hierarchy determined by a scope of the finishing operations, and wherein the structured hierarchy comprises:
an innermost level comprising medium-map-level finishing on a collection of media,
a second level comprising document-level finishing on a selected document in the print file,
a third level comprising document-level finishing on each document in the print file; and
an outermost level comprising print-file level finishing operations;
nesting commands, that correspond to the printing and finishing operations, according to the defined order in which the printing and finishing operations are performed, wherein the nesting of at least the commands corresponding to the finishing operations is performed at least at a page description language level; and
providing control signals for controlling printing and finishing equipment according to the ordered commands.

12. A system for nesting finishing operations comprising:
a data source comprising a printfile;
printer control data, communicatively coupled to the data source, specifying finishing operations for the printfile according to a first architecture;
a first communications link, communicatively coupled to the data source, for carrying printer control data for the finishing operations according to the first architecture, wherein the first architecture is a page description language architecture;
a print server, communicatively coupled to the first communications link, for matching the printer control data with a predetermined set of rules which define an order in which the finishing operations are performed and nesting commands that correspond to the finishing operations, wherein each command is nested according to a scope of the corresponding finishing operation and the defined order in which the finishing operation is performed, and wherein the predetermined set of rules specifies performing the finishing operations according to a structured hierarchy determined by a scope of the finishing operations, and wherein the structured hierarchy comprises:
an innermost level comprising medium-map-level finishing on a collection of media,
a second level comprising document-level finishing on a selected document in the print file,
a third level comprising document-level finishing on each document in the print file; and
an outermost level comprising print-file level finishing operations;
a second communications link, communicatively coupled to the print server, for communicating the finishing operations and the predetermined set of rules to at least one print controller according to a second architecture;
at least one print controller, communicatively coupled to the second communications link, for controlling the order in which the finishing operations are performed;
a third communications link, communicatively coupled to the at least one print controller, for communicating the finishing operations to at least one post-processing device; and
at least one post-processing device, communicatively coupled to the third communications link, for performing the finishing operations according to the predetermined set of rules.

13. The system of claim 12, wherein the first architecture is Mixed Object Document Content Architecture.

14. The system of claim 12, wherein the first architecture comprises a data structure comprising:
a first parameter specifying a scope of a finishing operation;

a second parameter specifying boundary conditions for medium-map level finishing; and a third parameter specifying the finishing operation.

15. The system of claim 12, wherein the second architecture is Intelligent Printer Data Stream.

16. The system of claim 12, wherein the second architecture comprises a data structure comprising:

a first parameter specifying a scope of a finishing operation;

a second parameter specifying boundary conditions for medium-map level finishing; and a third parameter specifying the finishing operation.

17. The system according to claim 12, wherein the second communications link is a bi-directional, point-to-point link between the printer server and a printer.

18. The system according to claim 12, wherein the third communications link comprises a Universal Printer Pre- and Post-Processing Interface data link that connects the at least one print controller to the at least one post-processing device.

19. The system according to claim 12, wherein the predetermined set of rules is a Form Definition.

20. The system according to claim 19, wherein the Form Definition comprises at least one medium map.

21. A computer readable medium comprising computer instructions for nesting finishing operations, the computer instructions comprising instructions for:

receiving printer control data for controlling printing and finishing operations according to the printing and finishing architecture;

matching the printer control data with a predetermined set of rules that define an order in which the printing and finishing operations are performed wherein the predetermined set of rules specifies performing the finishing operations according to a structured hierarchy determined by a scope of the finishing operations, and wherein the structured hierarchy comprises:

an innermost level comprising medium-map-level finishing on a collection of media, a second level comprising document-level finishing on a selected document in the print file, a third level comprising document-level finishing on each document in the print file; and an outermost level comprising print-file level finishing operations;

nesting commands, that correspond to the printing and finishing operations, according to the defined order in which the printing and finishing operations are performed, wherein the nesting of at least the commands corresponding to the finishing operations is performed at least at a page description language level; and providing control signals for controlling printing and finishing equipment according to the ordered commands.

22. A computer readable medium comprising computer instructions for nesting finishing operations, the computer instructions comprising instructions for:

specifying finishing operations for a printfile according to a first architecture wherein the first architecture is a page description language architecture;

establishing a first communications link from a data source to a print server, wherein the first communications link carries printer control data for the finishing operations according to the first architecture;

matching the printer control data with a predetermined set of rules which define an order in which the finishing operations are performed wherein the predetermined set of rules specifies performing the finishing operations according to a structured hierarchy determined by a scope of the finishing operations, and wherein the structured hierarchy comprises:

an innermost level comprising medium-man-level finishing on a collection of media, a second level comprising document-level finishing on a selected document in the print file, a third level comprising document-level finishing on each document in the print file; and an outermost level comprising print-file level finishing operations;

nesting commands that correspond to the finishing operations, wherein each command is nested according to a scope of the corresponding finishing operation and the defined order in which the finishing operation is performed;

establishing a second communications link from the data source to at least one print controller;

communicating the finishing operations and the predetermined set of rules to the at least one print controller according to a second architecture;

establishing a third communications link from the at least one print controller to at least one post-processing device;

communicating the finishing operations to the at least one post-processing device; and performing the finishing operations according to the predetermined set of rules.

23. The computer readable medium of claim 22, wherein the first architecture is Mixed Object Document Content Architecture.

24. The computer readable medium of claim 22, wherein the first architecture comprises a data structure comprising:

a first parameter specifying a scope of a finishing operation;

a second parameter specifying boundary conditions for medium-map level finishing; and a third parameter specifying the finishing operation.

25. The computer readable medium of claim 22, wherein the second architecture is Intelligent Printer Data Stream.

26. The computer readable medium of claim 22, wherein the second architecture comprises a data structure comprising:

a first parameter specifying a scope of a finishing operation;

a second parameter specifying boundary conditions for medium-map level finishing; and a third parameter specifying the finishing operation.

27. The computer readable medium according to claim 22, wherein the second communications link is a bi-directional, point-to-point link between the server and a printer.

28. The computer readable medium according to claim 22, wherein the third communications link comprises a Universal Printer Pre- and Post- Processing Interface data link that connects the at least one print controller to the at least one post-processing device.

29. The computer readable medium according to claim 22, wherein the predetermined set of rules is a Form Definition.

30. The computer readable medium according to claim 29, wherein the Form Definition comprises at least one medium map.

* * * * *